US012671132B2

(12) United States Patent
Lim et al.

(10) Patent No.: US 12,671,132 B2
(45) Date of Patent: Jun. 30, 2026

(54) BATTERY CELL AND BATTERY MODULE INCLUDING THE SAME

(71) Applicant: LG Energy Solution, Ltd., Seoul (KR)

(72) Inventors: Hun-Hee Lim, Daejeon (KR);
Sang-Hun Kim, Daejeon (KR);
Min-Hyeong Kang, Daejeon (KR);
Dae-Woong Song, Daejeon (KR);
Hyung-Kyun Yu, Daejeon (KR);
Soo-Ji Hwang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 656 days.

(21) Appl. No.: 18/024,576

(22) PCT Filed: May 24, 2022

(86) PCT No.: PCT/KR2022/007376
§ 371 (c)(1),
(2) Date: Mar. 3, 2023

(87) PCT Pub. No.: WO2022/250429
PCT Pub. Date: Dec. 1, 2022

(65) Prior Publication Data
US 2023/0318101 A1     Oct. 5, 2023

(30) Foreign Application Priority Data
May 24, 2021     (KR) ........................ 10-2021-0066462

(51) Int. Cl.
H01M 50/193          (2021.01)
H01M 50/30           (2021.01)
(Continued)

(52) U.S. Cl.
CPC ....... H01M 50/193 (2021.01); H01M 50/394 (2021.01); H01M 10/052 (2013.01);
(Continued)

(58) Field of Classification Search
CPC ............ H01M 10/052; H01M 50/103; H01M 50/105; H01M 50/178; H01M 50/183;
(Continued)

(56) References Cited

U.S. PATENT DOCUMENTS

2013/0122336 A1     5/2013   Park et al.
2013/0208405 A1*    8/2013   Okada ................. H01M 50/383
                                                              361/521
(Continued)

FOREIGN PATENT DOCUMENTS

EP          4343801 A1      3/2024
JP       2001093489 A       4/2001
(Continued)

OTHER PUBLICATIONS

International Search Report for PCT/KR2022/007376 mailed Sep. 14, 2022. 3 pgs.
(Continued)

*Primary Examiner* — Lingwen R Zeng
(74) *Attorney, Agent, or Firm* — Lerner David LLP

(57)          ABSTRACT

A battery cell includes a battery case having an accommodation portion in which an electrode assembly is mounted, and a sealing portion formed by sealing an outer periphery thereof. A gas discharge portion can be inserted into the sealing portion. The gas discharge portion can protrude from the inside of the battery case toward the outside of the battery case. The gas discharge portion can include a non-adhesive layer and an adhesive layer located on the non-adhesive layer. The non-adhesive layer and the adhesive layer can be bent to be opened toward the inside of the battery case.

17 Claims, 4 Drawing Sheets

(51) Int. Cl.

| | |
|---|---|
| *H01M 10/052* | (2010.01) |
| *H01M 50/103* | (2021.01) |
| *H01M 50/105* | (2021.01) |
| *H01M 50/178* | (2021.01) |
| *H01M 50/183* | (2021.01) |
| *H01M 50/186* | (2021.01) |
| *H01M 50/342* | (2021.01) |
| *H01M 50/367* | (2021.01) |

(52) U.S. Cl.

CPC ........ *H01M 50/103* (2021.01); *H01M 50/105* (2021.01); *H01M 50/178* (2021.01); *H01M 50/183* (2021.01); *H01M 50/186* (2021.01); *H01M 50/30* (2021.01); *H01M 50/342* (2021.01); *H01M 50/367* (2021.01); *Y02E 60/10* (2013.01)

(58) Field of Classification Search

CPC .. H01M 50/186; H01M 50/193; H01M 50/30; H01M 50/342; H01M 50/367; H01M 50/394; Y02E 60/10

See application file for complete search history.

(56) References Cited

U.S. PATENT DOCUMENTS

| | | | | |
|---|---|---|---|---|
| 2018/0114964 | A1* | 4/2018 | Kim | ..................... H01M 50/172 |
| 2018/0254468 | A1 | 9/2018 | Kim et al. | |
| 2020/0028128 | A1* | 1/2020 | Hwang | ................ H01M 50/119 |
| 2021/0036269 | A1* | 2/2021 | Lee | ..................... H01M 50/105 |
| 2021/0167460 | A1 | 6/2021 | Park et al. | |
| 2022/0336922 | A1 | 10/2022 | Hwang et al. | |
| 2023/0344043 | A1 | 10/2023 | Lim et al. | |

FOREIGN PATENT DOCUMENTS

| | | | | |
|---|---|---|---|---|
| JP | 2005-116235 | A | | 4/2005 |
| JP | 2007250226 | A | | 9/2007 |
| JP | 2012190639 | A | † | 10/2012 |
| JP | 2016143524 | A | † | 8/2016 |
| KR | 101123061 | B1 | | 3/2012 |
| KR | 101419570 | B1 | | 7/2014 |
| KR | 101462041 | B1 | | 11/2014 |
| KR | 2017-0027150 | A | | 3/2017 |
| KR | 20170055113 | A | | 5/2017 |
| KR | 101753213 | B1 | | 7/2017 |
| KR | 2018-0038880 | A | | 4/2018 |
| KR | 2018-0131865 | A | | 12/2018 |
| KR | 2019-0042953 | A | | 4/2019 |
| KR | 102159368 | B1 | | 9/2020 |
| KR | 2020-0139530 | A | | 12/2020 |
| KR | 2021-0025405 | A | | 3/2021 |
| KR | 2021-0042738 | A | | 4/2021 |
| WO | 2018110067 | A1 | | 6/2018 |
| WO | 2022-231277 | A1 | | 11/2022 |
| WO | 2022244853 | A1 | | 11/2022 |

OTHER PUBLICATIONS

Extended European Search Report including Written Opinion for Application No. 22811622.4 dated Jun. 10, 2024. 9 pgs.

\* cited by examiner

† cited by third party

BATTERY CELL AND BATTERY MODULE INCLUDING THE SAME

CROSS-REFERENCE TO RELATED APPLICATIONS

The present application is a national phase entry under 35 U.S.C. § 371 of International Application No. PCT/KR2022/007376 filed on May 24, 2022, which claims priority to Korean Patent Application No. 10-2021-0066462 filed on May 24, 2021, the disclosures of which are incorporated herein by reference.

TECHNICAL FIELD

The present disclosure relates to a battery cell and a battery module including the same, and more particularly, to a battery cell capable of suppressing penetration of moisture into the battery cell while having improved external emission of gas generated inside the battery cell, and a battery module including the same.

BACKGROUND ART

As technology development and demand for mobile devices increase, the demand for secondary batteries as an energy source is rapidly increasing. In particular, secondary batteries are of great interest as energy sources not only for mobile devices such as mobile phones, digital cameras, notebooks and wearable devices, but also for power devices such as electric bicycles, electric vehicles and hybrid electric vehicles.

Depending on the shape of a battery case, these secondary batteries are classified into a cylindrical battery and a prismatic battery in which a battery assembly is included in a cylindrical or prismatic metal can, and a pouch-type battery in which the battery assembly is included in a pouch-type case of an aluminum laminate sheet. Here, the battery assembly included in the battery case is a power element including a positive electrode, a negative electrode, and a separator interposed between the positive electrode and the negative electrode, and capable of charging and discharging, and is classified into a jelly-roll type in which long sheet-type positive and negative electrodes coated with an active material are wound with a separator being interposed therebetween, and a stack type in which a plurality of positive and negative electrodes are sequentially stacked with a separator being interposed therebetween.

Among them, in particular, a pouch-type battery in which a stack-type or stack/folding-type battery assembly is included in a pouch-type battery case made of an aluminum laminate sheet is being used more and more due to low manufacturing cost, small weight, and easy modification.

However, as the energy density of the battery cell increases in recent years, there is a problem that the amount of gas generated inside the battery cell also increases. In particular, if the gas generated inside the battery cell is not easily discharged, a venting may occur in the battery cell due to gas generation. Also, even if a separate venting portion is included in the battery cell, moisture may penetrate into the battery cell through the venting portion, which may cause deterioration of battery performance and additional gas generation due to resultant side reactions. Accordingly, there is an increasing need to develop a battery cell capable of preventing penetration of external moisture into the battery cell while having improved external emission of gas generated inside the battery cell.

DISCLOSURE

Technical Problem

The present disclosure is designed to solve the problems of the related art, and therefore the present disclosure is directed to providing a battery cell capable of suppressing penetration of external moisture into the battery cell while having improved external emission of gas generated inside the battery cell, and a battery module including the same.

The object to be solved by the present disclosure is not limited to the above-mentioned object, and the objects not mentioned here may be clearly understood by those skilled in the art from this specification and the accompanying drawings.

Technical Solution

In one aspect of the present disclosure, there is provided a battery cell, comprising: a battery case having an accommodation portion in which an electrode assembly is mounted, and a sealing portion formed by sealing an outer periphery thereof; and a gas discharge portion inserted into the sealing portion, wherein the gas discharge portion protrudes from the inside of the battery case toward the outside of the battery case, the gas discharge portion includes a non-adhesive layer and an adhesive layer located on the non-adhesive layer, and the non-adhesive layer and the adhesive layer are bent to be opened toward the inside of the battery case.

The non-adhesive layer may include a first non-adhesive layer and a second non-adhesive layer spaced apart from each other, and an end of the first non-adhesive layer and an end of the second non-adhesive layer adjacent to an outer side of the sealing portion may be connected and integrated with each other.

The gas discharge portion may include a gas inlet located between the first non-adhesive layer and the second non-adhesive layer, and the gas inlet may be opened toward the inside of the battery case.

The adhesive layer may include a first adhesive layer located on an upper surface of the first non-adhesive layer and a second adhesive layer located on a lower surface of the second non-adhesive layer, and an end of the first adhesive layer and an end of the second adhesive layer adjacent to the outer side of the sealing portion may be connected and integrated with each other.

Based on a protruding direction of the gas discharge portion, the first adhesive layer may extend along a side surface of the first non-adhesive layer, and the second adhesive layer may extend along a side surface of the second non-adhesive layer.

Based on the protruding direction of the gas discharge portion, the first adhesive layer and the second adhesive layer may extend between the first non-adhesive layer and the second non-adhesive layer, respectively.

A pair of first adhesive layers and a pair of second adhesive layers may be located at both sides of the gas inlet, respectively.

The adhesive layer and the non-adhesive layer may have a structure in which the adhesive layer surrounds a lower surface and both side surfaces of the non-adhesive layer and surrounds both ends of an upper surface of the non-adhesive layer, and the gas discharge portion may have a structure in which the adhesive layer and the non-adhesive layer are folded based on a boundary line.

The non-adhesive layer may be a film made of a non-adhesive material.

The non-adhesive material may be made of a fluorine-based polymer material.

The fluorine-based polymer material may be at least one of polytetrafluoroethylene (PTFE), polyvinylidene fluoride (PVDF), polymethylpentene (TPX), fluorinated ethylene propylene (FEP), and perfluoroalkoxyalkane (PFA).

The adhesive layer may be made of an adhesive composition consisting of at least one of polyolefin-based material, epoxy, and polyvinyl chloride (PVC).

The adhesive layer may be a film made of the adhesive composition.

The adhesive layer may be formed by applying the adhesive composition on the non-adhesive layer.

The adhesive layer may have a thickness equal to or smaller than a thickness of the non-adhesive layer.

The adhesive layer may have gas permeability of 20 Barrer to 60 Barrer at 60° C.

The non-adhesive layer may have gas permeability of 40 Barrer or more at 60° C.

The adhesive layer may have a moisture penetration amount of 0.02 g to 0.2 g for 10 years at 25° C., 50% RH.

In another aspect of the present disclosure, there is also provided a battery module, comprising the battery cell described above.

Advantageous Effects

According to embodiments, the present disclosure provides a battery cell having a structure including a non-adhesive layer and an adhesive layer located on the non-adhesive layer, wherein the non-adhesive layer and the adhesive layer includes a gas discharge portion bent to be opened toward the inside of the battery case, and also provides a battery module including the same, so that the external discharge of gas generated inside the battery cell is increased, and penetration of moisture flowing into the battery cell is suppressed.

According to the present disclosure, since the gas generated inside the battery cell is easily discharged to the outside through the gas discharge portion, it is possible to prevent a venting phenomenon from occurring in the battery cell, thereby increasing the lifespan of the battery cell.

According to the present disclosure, since the gas is discharged through the gas discharge portion and moisture does not penetrate into the battery cell, it is possible to prevent the battery performance of the battery cell from deteriorating due to a side reaction caused by the penetration of moisture and prevent the generation of additional gas.

The effect of the present disclosure is not limited to the above effects, and the effects not mentioned here will be clearly understood by those skilled in the art from this specification and the accompanying drawings.

BEST MODE

Figure 1:
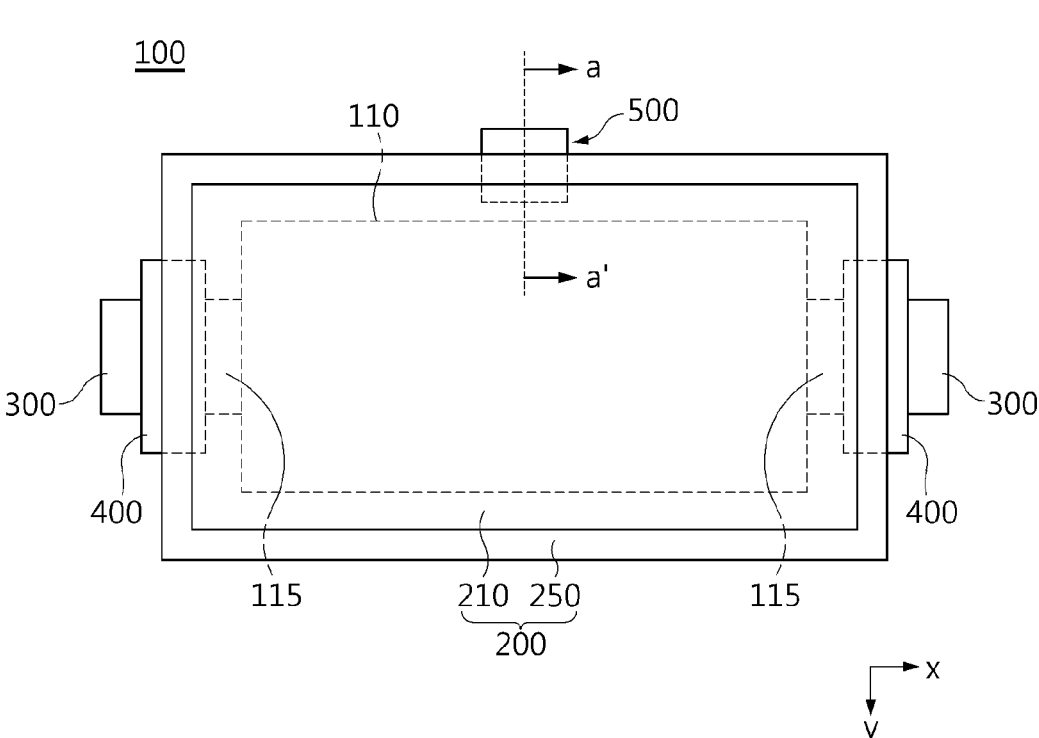
FIG. 1 is a front view of a battery cell according to an embodiment of the present disclosure.

Hereinafter, with reference to the accompanying drawings, various embodiments of the present disclosure will be described in detail so as to be easily implemented by those skilled in the art. The present disclosure may be implemented in various different forms and is not limited to the embodiments described herein.

In order to clearly explain the present disclosure, parts irrelevant to the description are omitted, and identical or similar components are endowed with the same reference signs throughout the specification.

In addition, since the size and thickness of each component shown in the drawings are arbitrarily expressed for convenience of description, the present disclosure is not necessarily limited to the drawings. In order to clearly express various layers and regions in the drawings, the thicknesses are enlarged. Also, in the drawings, for convenience of explanation, the thickness of some layers and regions is exaggerated.

In addition, throughout the specification, when a part "includes" a certain component, it means that other components may be further included, rather than excluding other components, unless otherwise stated.

In addition, throughout the specification, when referring to "top view", it means that the target part is viewed from above, and when referring to "cross-sectional view", it means that a vertically-cut section of the target part is viewed from a side.

FIG. 1 is a diagram showing a battery cell according to an embodiment of the present disclosure.

Referring to FIG. 1, the battery cell 100 according to an embodiment of the present disclosure includes a battery case 200 having an accommodation portion 210 in which an electrode assembly 110 is mounted, and a sealing portion 250 formed by sealing an outer periphery thereof; and a gas discharge unit 500 inserted into the sealing portion 250.

The battery case 200 may be a laminate sheet including a resin layer and a metal layer. More specifically, the battery case 200 may be made of a laminate sheet, and may include an outer resin layer forming the outermost layer, a barrier metal layer preventing penetration of materials, and an inner resin layer for sealing.

The electrode assembly 110 may have a structure of a jelly-roll type (winding type), a stack type (lamination type), or a composite type (stack/folding type). More specifically, the electrode assembly 110 may include a positive electrode, a negative electrode, and a separator disposed therebetween.

The electrode lead 300 is electrically connected to an electrode tab 115 included in the electrode assembly 110, and protrudes out of the battery case 200 via the sealing portion 250. In addition, the lead film 400 is located at a portion corresponding to the sealing portion 250 in at least one of an upper portion and a lower portion of the electrode lead 300. Accordingly, the lead film 400 may improve the sealing properties of the sealing portion 250 and the electrode lead 300 while preventing a short circuit from occurring in the electrode lead 300 during laminating.

The lead film 400 may have a wider width than the electrode lead 300. Here, the width of the lead film 400 means a maximum value of the distance between one end and the other end of the lead film 400 in a direction orthogonal to the protruding direction of the electrode lead 300, and the width of the electrode lead 300 means a maximum value of the distance between one end and the other end of the electrode lead 300 in a direction orthogonal to the protruding direction of the electrode lead 300. The lead film 400 may have a greater length than the sealing portion 250, but may have a smaller length than the electrode lead 300. Here, the length of the lead film 400 means a maximum value of the distance between one end and the other end of the lead film in the protruding direction of the electrode lead 300, and the length of the sealing portion 250 means a maximum value of the distance between one end and the other end of the sealing portion 250 in the protruding direction of the electrode lead 300. The length of the electrode lead 300 means a maximum value of the distance between one end and the other end of the electrode lead 300 in the protruding direction of the electrode lead 300. Accordingly, the lead film 400 may prevent the side surface of the electrode lead 300 from being exposed to the outside without interfering with the electrical connection of the electrode lead 300.

The gas discharge unit 500 may be inserted into at least a part of the sealing portion 250. Here, the gas discharge portion 500 may be fused together with the sealing portion 250, and the gas discharge portion 500 may be fixed via the sealing portion 250. For example, the gas discharge portion 500 may be heat-fused and/or press-fused together with the sealing portion 250.

More specifically, as shown in FIG. 1, the gas discharge unit 500 may be located in the outer periphery of the sealing portion 250 where the electrode lead 300 is not located. In other words, the gas discharge unit 500 may be inserted into the sealing portion 250 adjacent to a side of the electrode assembly 110. Accordingly, the gas discharge unit 500 may be manufactured very simply and sufficiently secure a gas discharge path by the gas discharge unit 500 without interfering with the electrical connection of the electrode lead 300.

As another example, although not specifically shown in the drawings, the gas discharge unit 500 may be located in the outer periphery of the sealing portion 250 where the electrode lead 300 is located. In other words, the gas discharge unit 500 may be located in the same outer periphery as the electrode lead 300, but spaced apart from the electrode lead 300. Accordingly, since the gas discharge unit 500 protrudes in the same direction as the electrode lead 300, there is an advantage in that the space efficiency of the battery cell 100 may be further improved.

Hereinafter, the gas discharge unit 500 will be described in more detail.

Figure 2:
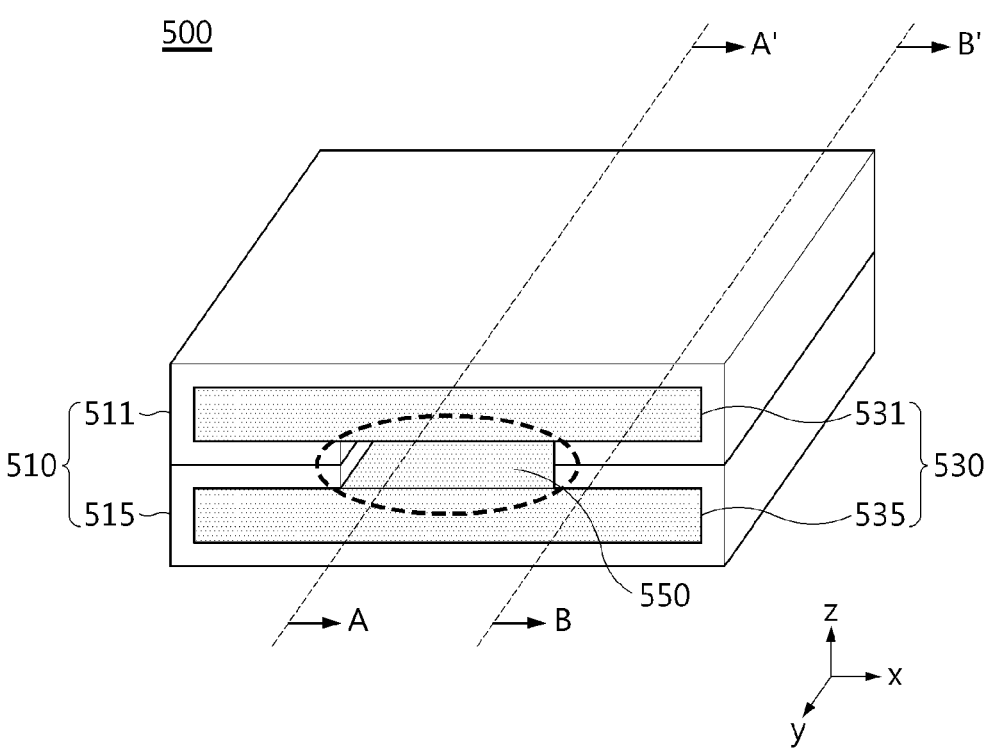
FIG. 2 is a perspective view showing a gas discharge portion of the battery cell of FIG. 1.
Figure 3:
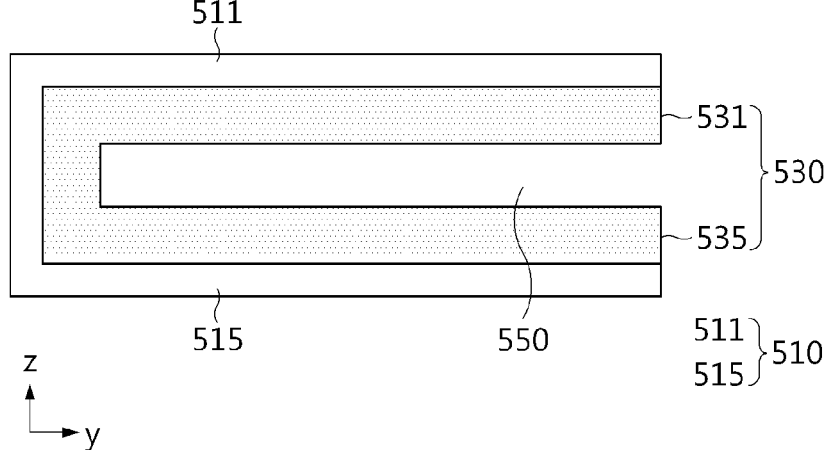
FIG. 3 is a cross-sectional view, taken along a line A-A' of FIG. 2.
Figure 4:
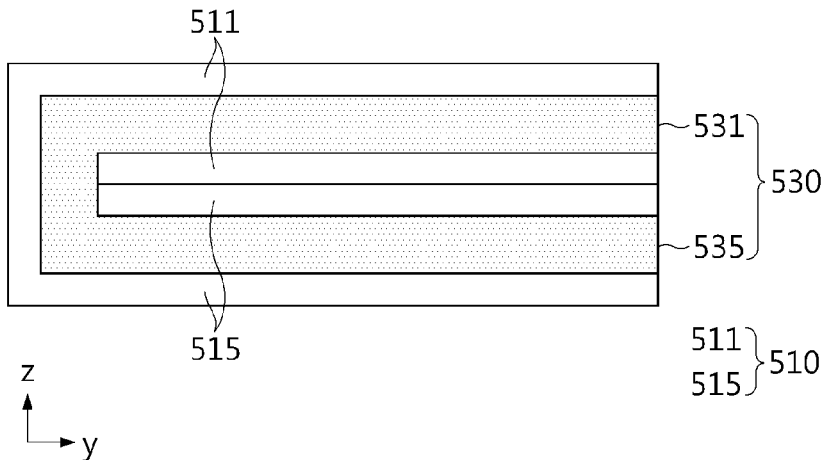
FIG. 4 is a cross-sectional view, taken along a line B-B' of FIG. 2.

FIG. 2 is a perspective view showing a gas discharge portion of FIG. 1. FIG. 3 is a cross-sectional view, taken along the cutting line A-A' of FIG. 2. FIG. 4 is a cross-sectional view, taken along the cutting line B-B' of FIG. 2.

Referring to FIG. 1, the gas discharge portion 500 may protrude from the inside of the battery case 200 toward the outside of the battery case 200. More specifically, the gas discharge portion 500 may protrude from the inside of the battery case 200 toward the outside of the battery case 200 via the sealing portion 250.

Referring to FIGS. 1 to 4, the gas discharge portion 500 includes a non-adhesive layer 530 and an adhesive layer 510 located on the non-adhesive layer 530, and the non-adhesive layer 530 and the adhesive layer 510 are bent to be opened toward the inside of the battery case 200. Here, the gas discharge portion 500 may have a structure in which the adhesive layer 510 surrounds an outer surface of the non-adhesive layer 530. That is, an inner surface of the gas discharge portion 500 may be formed as the non-adhesive layer 530, and an outer surface of the gas discharge portion 500 may be formed as the adhesive layer 510.

Here, the adhesive layer 510 may refer to an adhesive layer that can be adhered by heat-fusion and/or press-fusion. In addition, the non-adhesive layer 53 may refer to a non-adhesive layer that cannot be adhered by heat-fusion and/or press-fusion.

Accordingly, the sealing degree between the gas discharge portion 500 and the sealing portion 250 may be improved due to the adhesive layer 510 located on the outer surface of the gas discharge portion 500.

Referring to FIGS. 1 to 4, the non-adhesive layer 530 includes a first non-adhesive layer 531 and a second non-adhesive layer 535 spaced apart from each other. Here, an end of the first non-adhesive layer 531 and an end of the second non-adhesive layer 535 adjacent to the outer side of the sealing portion 250 may be connected and integrated with each other. That is, the ends of the first non-adhesive layer 531 and the second non-adhesive layer 535 opposite to the ends connected to each other are spaced apart from each other, so that one surface of the non-adhesive layer 530 may be opened toward the inside of the battery case 200.

Referring to FIGS. 2 and 3, the gas discharge portion 500 may include a gas inlet 550 located between the first non-adhesive layer 531 and the second non-adhesive layer 535. Here, the gas inlet 550 may be opened toward the inside of the battery case 200. More specifically, the gas inlet 550 may refer to a space spaced apart between the first non-adhesive layer 531 and the second non-adhesive layer 535.

Accordingly, in the battery cell 100 according to this embodiment, since the gas inlet 550 is formed at one surface of the gas discharge portion 500 located inside the battery case 200, the gas generated inside the battery cell 100 may be easily introduced into the gas discharge portion 500.

Referring to FIGS. 1 to 3, the adhesive layer 510 includes a first adhesive layer 511 located on the upper surface of the first non-adhesive layer 531 and a second adhesive layer 515 located on the lower surface of the second non-adhesive layer 535. Here, an end of the first adhesive layer 511 and an end of the second adhesive layer 515 adjacent to the outer side of the sealing portion 250 may be connected and integrated with each other. That is, the adhesive layer 510 may extend along the outer surface of the non-adhesive layer 530, and one surface of the adhesive layer 510 may be opened toward the inside of the battery case 200.

Referring to FIG. 2, based on a protruding direction of the gas discharge portion 500, the first adhesive layer 511 may extend along the side surface of the first non-adhesive layer 531, and the second adhesive layer 515 may extend along the side surface of the second non-adhesive layer 535. More specifically, the first adhesive layer 511 may extend along both side surfaces of the first non-adhesive layer 531, respectively, and the second adhesive layer 515 may extend along both side surfaces of the second non-adhesive layer 535, respectively.

Accordingly, in the gas discharge portion 500, the side surface of the non-adhesive layer 530 may be covered by the adhesive layer 510, so that the non-adhesive layer 530 may not be exposed to the outside. That is, it is possible to prevent moisture in the outside of the battery cell 100 from penetrating into the battery cell 100 through the non-adhesive layer 530.

Referring to FIGS. 2 and 4, based on the protruding direction of the gas discharge portion 500, the first adhesive layer 511 and the second adhesive layer 515 may extend between the first non-adhesive layer 531 and the second non-adhesive layer 535, respectively. In other words, the first adhesive layer 511 may extend at both ends of the lower surface of the first non-adhesive layer 531, respectively, and the second adhesive layer 515 may extend at both ends of the upper surface of the second non-adhesive layer 535, respectively.

Here, the adhesive layer 510 may not be formed in the center portion of the lower surface of the first non-adhesive layer 531 and the upper surface of the second non-adhesive layer 535. That is, the gas inlet 550 is formed in the center portion of the lower surface of the first non-adhesive layer 531 and the upper surface of the second non-adhesive layer 535, and a pair of first adhesive layers 511 and a pair of second adhesive layers 515 may be located at both sides of the gas inlet 550, respectively. In this case, in the pair of first adhesive layers 511 and the pair of second adhesive layers 515 respectively located at both sides of the gas inlet 550, the pair of first adhesive layers 511 and the pair of second adhesive layers 515 may be adhered to each other when being fused with the sealing portion 250.

Accordingly, since the gas discharge portion 500 includes the adhesive layers 510 formed at both sides of the gas inlet 550, the height of the gas inlet 550 may be relatively increased while increasing the sealing strength of the gas discharge portion 500, so gas may be introduced and discharged easily through the gas inlet 550.

In addition, the gas discharge portion 500 may adjust the width of the gas inlet 550 by adjusting the length of the adhesive layer 510 formed at both sides of the gas inlet 550. Here, the length of the adhesive layer 510 means a maximum value of the distance between one end and the other end of the adhesive layer 510 in a direction orthogonal to the protruding direction of the gas discharge portion 500. The width of the gas inlet 550 means a maximum value of the distance between one end and the other end of the gas inlet 550 in a direction orthogonal to the protruding direction of the gas discharge portion 500.

Accordingly, when the length of the adhesive layers 510 formed at both sides of the gas inlet 550 is relatively small, the width of the gas inlet 550 may be relatively large, so that the gas may be introduced and discharged more easily through the gas inlet 550. In addition, when the length of the adhesive layers 510 formed at both sides of the gas inlet 550 is relatively long, the sealing degree of the gas discharge portion 500 may be further improved.

Here, the non-adhesive layer 530 may a film made of a non-adhesive material. For example, the non-adhesive material may be formed of a fluorine-based polymer material. The fluorine-based polymer material may be at least one of polytetrafluoroethylene (PTFE), polyvinylidene fluoride (PVDF), polymethylpentene (TPX), fluorinated ethylene propylene (FEP), and perfluoroalkoxyalkane (PFA). However, it is not limited thereto, and any material having a relatively high melting point and thus is not dissolved during fusion with the sealing portion 250 may be included in this embodiment. The fluorine-based polymer material is advantageous for moisture sealing and has the property of easily permeating gas. In addition, it is a material that is stable in the environment within the battery cell 100. For example, it is a material that does not react with the electrolyte contained in battery cell 100.

In one embodiment of the present disclosure, the gas permeability of the non-adhesive layer 530 may be 40 Barrer or more at 60° C. For example, the carbon dioxide permeability of the non-adhesive layer 530 may satisfy the above range.

In one embodiment of the present disclosure, the non-adhesive layer 530 may be made of a fluorine-based polymer material. The fluorine-based polymer material may be at least one of polytetrafluoroethylene (PTFE), polyvinylidene fluoride (PVDF), polymethylpentene (TPX), fluorinated ethylenepropylene (FEP), and perfluoroalkoxyalkane (PFA), as mentioned above. For example, the fluorine-based polymer material may be at least one of polytetrafluoroethylene (PTFE), polyvinylidene fluoride (PVDF), polymethylpentene (TPX), fluorinated ethylenepropylene (FEP), and perfluoroalkoxyalkane (PFA), which satisfy the gas permeability and/or the moisture penetration amount mentioned above.

Here, the adhesive layer 510 may be made of an adhesive composition including at least one of a polyolefin-based material, an epoxy, and polyvinyl chloride (PVC). For example, the polyolefin-based material may be polyethylene (PE), polypropylene (PP), or the like. However, the present invention is not limited thereto, and any material that is fused and adhered together with the sealing portion 250 may be included in this embodiment.

The adhesive layer 510 may have a lower melting point than the non-adhesive layer 530. Accordingly, the sealing property may be further improved.

In an embodiment of the present disclosure, the gas permeability of the adhesive layer 510 may be 20 Barrer to 60 Barrer, or 30 Barrer to 40 Barrer at 60° C. For example, the carbon dioxide permeability of the adhesive layer 510 may satisfy the above range. In addition, the gas permeability may satisfy the above range at 60° C. based on a thickness of 200 µm of the adhesive layer 510. When the gas permeability of the adhesive layer 510 satisfies the above range, the gas generated inside the secondary battery may be more effectively discharged.

In this specification, the gas permeability may be measured by ASTM F2476-20.

In one embodiment of the present disclosure, the moisture penetration amount of the adhesive layer 510 may be 0.02 g to 0.2 g, or 0.02 g to 0.04 g, or 0.06 g or 0.15 g for 10 years at 25° C., 50% RH. If the moisture penetration amount of the adhesive layer 510 satisfies the above range, it may be more effective to prevent penetration of moisture introduced from the adhesive layer 510.

In one embodiment of the present disclosure, the adhesive layer 510 may have a gas permeability of 20 Barrer to 60 Barrer at 60° C. and a moisture penetration amount of 0.02 g to 0.2 g at 25° C., 50% RH for 10 years. If the gas permeability and the moisture penetration amount of the adhesive layer 510 satisfy the above ranges, it may be more effective to prevent moisture penetration from the outside while discharging the gas generated inside the secondary battery.

The moisture penetration amount of the adhesive layer 510 may be measured by adopting the ASTM F 1249 method. At this time, the moisture penetration amount may be measured using equipment officially certified by MCOON.

In an embodiment of the present disclosure, the adhesive layer 510 may be made of an adhesive composition consisting of at least one of a polyolefin-based material, an epoxy, and polyvinyl chloride (PVC), and the polyolefin-based material may be polyethylene (PE), polypropylene (PP) or the like, as mentioned above. For example, the adhesive layer 510 may be polyethylene (PE), polypropylene (PP), or the like, which satisfy the gas permeability and/or the moisture penetration amount mentioned above.

In addition, since the adhesive layer 510 is made of the above material, it is possible to maintain airtightness of the battery cell 100 and prevent the internal electrolyte from leaking.

In addition, the adhesive layer 510 may be a film made of the adhesive composition. Also, the adhesive layer 510 may be formed by applying the adhesive composition on the non-adhesive layer. However, the shape of the adhesive layer 510 is not limited thereto, and any shape capable of easily surrounding the outer surface of the non-adhesive layer 530 may be used without limitation.

Accordingly, as shown in FIGS. 2 to 4, since the gas discharge portion 500 has a structure in which the adhesive layer 510 made of the above material becomes the outer surface of the gas discharge portion 500, the adhesive layer 510 may be fused and adhered together with the sealing portion 250. In addition, the non-adhesive layer 530 made of the above material is located inside the gas discharge portion 500, and the first non-adhesive layer 531 and the second non-adhesive layer 535 facing each other are not fused with each other, so the inside of the gas discharge portion 500 may serve as a gas discharge passage. Moreover, the non-adhesive layer 530 of the above material may prevent moisture in the outside of the battery cell 100 from penetrating into the battery cell 100 while improving the external discharge of the gas generated inside the battery cell 100.

In addition, the gas discharge portion 500 having the above structure is designed to be simply inserted when assembling the battery cell 100, so it is possible to assemble a battery cell having a new structure while maintaining the existing battery cell manufacturing process.

The thickness of the adhesive layer 510 may be equal to or smaller than the thickness of the non-adhesive layer 530. More specifically, the adhesive layer 510 may have a thickness of 0.1 µm or more and 100 µm or less. More specifically, the adhesive layer 510 may have a thickness of 0.5 µm or more and 90 µm or less. For example, the adhesive layer 510 may have a thickness of 1 µm or more and 80 µm or less. In addition, the non-adhesive layer 530 may have a thickness of 10 µm or more and 500 µm or less. More specifically, the non-adhesive layer 530 may have a thickness of 15 µm or more and 450 µm or less. For example, the non-adhesive layer 530 may have a thickness of 20 µm or more and 400 µm or less.

Accordingly, since the adhesive layer 510 may have a thickness in the above range, it is possible to minimize the effect of the non-adhesive layer 530 on the gas discharge of the gas discharge portion 500 while maintaining the sealing strength between the gas discharge portion 500 and the sealing portion 250. In addition, since the non-adhesive layer 530 may have a thickness in the above range, the gas introduced through the gas inlet 550 may be easily discharged through the non-adhesive layer 530 while suppressing the penetration of moisture flowing into the battery cell 100.

However, if the thickness of the adhesive layer 510 is less than 0.1 µm or more than 100 µm, the sealing strength between the gas discharge portion 500 and the sealing portion 250 is too weak, or the adhesive layer 510 prevents the gas discharge of the gas discharge portion 500. In addition, when the thickness of the non-adhesive layer 530 is less than 10 µm or more than 500 µm, the area of the non-adhesive layer 530 may be reduced to excessively reduce the discharge amount of gas or to excessively increase the thickness of the gas discharge portion 500.

Figure 5:
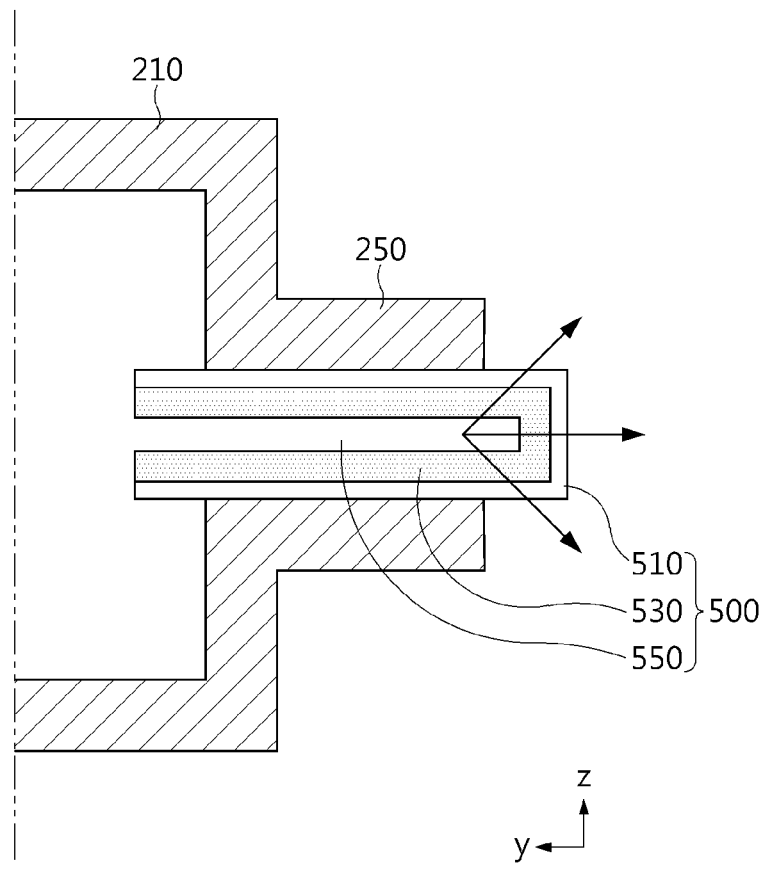
FIG. 5 is a cross-sectional view, taken along a line a-a' of FIG. 1.

FIG. 5 is a cross-sectional view, taken along the cutting line a-a' of FIG. 1.

Referring to FIGS. 2 and 5, in the battery cell 100 according to an embodiment of the present disclosure, one surface of the gas discharge portion 500 is opened toward the inside of the battery case 200, and the adhesive layer 510 becomes the outer surface of the gas discharge portion 500, so the adhesive layer 510 and the sealing portion 250 may be in contact with each other. In addition, the non-adhesive layer 530 may become the inner surface of the gas discharge portion 500, and a gas inlet 550 may be formed between the first non-adhesive layer 531 and the second non-adhesive layer 535.

Accordingly, in this embodiment, in the gas discharge portion 500, the gas inside the battery cell 100 may be introduced into the gas inlet 550 formed between the non-adhesive layer 530. In addition, the gas introduced into the gas inlet 550 may pass through the adhesive layer 510 and the non-adhesive layer 530 according to the pressure difference with the outside of the battery case 200, and the gas introduced into the gas inlet 550 may be discharged to the outside.

Figure 6:
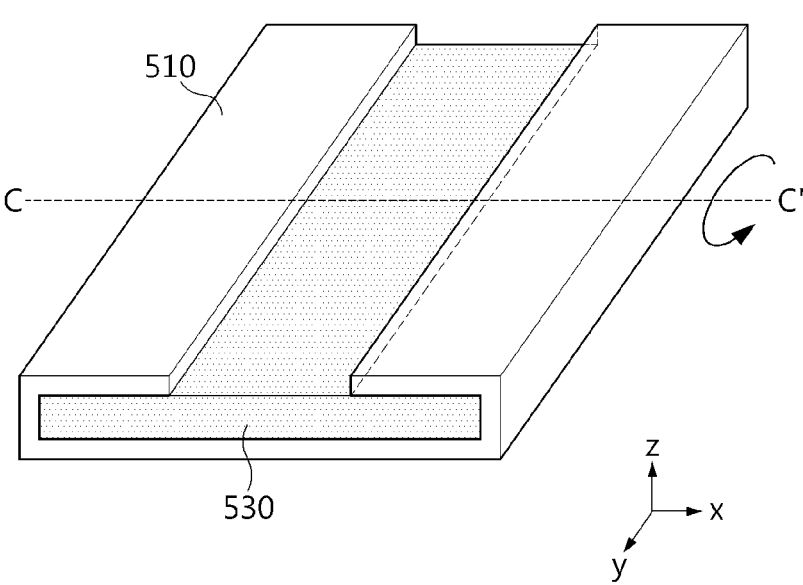
FIG. 6 is a perspective view of a shape of the gas discharge portion of FIG. 2 before being folded.

FIG. 6 is a diagram showing a shape of the gas discharge portion of FIG. 2 before being folded.

Referring to FIGS. 2 and 6, in the battery cell 100 according to another embodiment of the present disclosure, the gas discharge portion 500 may have a structure in which the adhesive layer 510 and the non-adhesive layer 530 are folded. More specifically, the adhesive layer 510 and the non-adhesive layer 530 may have a structure in which the adhesive layer 510 surrounds the lower surface and both side surfaces of the non-adhesive layer 530 and surrounds both ends of the upper surface of the non-adhesive layer 530, respectively. Here, in the gas discharge portion 500, the adhesive layer 510 and the non-adhesive layer 530 may be folded based on the boundary line C-C'. As an example, the boundary line C-C' may correspond to the center line based on the longitudinal direction of the adhesive layer 510 and the non-adhesive layer 530.

In addition, a region of the upper surface of the non-adhesive layer 530 where the adhesive layer 510 is not formed may have a rectangular shape as shown in FIG. 6 or may have shapes of various patterns such as a circular shape and an oval shape.

In this method of manufacturing the gas discharge portion 500, the non-adhesive layer 530 is disposed approximately in the center of the adhesive layer 510, so that all surfaces except for two surfaces of the non-adhesive layer 530 are covered with the adhesive layer 510, and both ends of the adhesive layer 510 are folded on the non-adhesive layer 530 to make a state as shown in FIG. 6. After that, it is folded based on the boundary line C-C,' and the adhesive layers 510 on the folded sides are adhered to each other by as heat-fusion or press-fusion. At this time, a non-adhesive inner space is formed between the folded non-adhesive layers 530, thereby providing the gas inlet 550.

Accordingly, the gas discharge portion 500 according to this embodiment may be formed to be folded based on a predetermined boundary line, so the manufacturing process may be relatively easy and the manufacturing cost may also be simplified.

In addition, a battery module according to another embodiment of the present disclosure includes the battery cell described above. Meanwhile, one or more battery modules according to this embodiment may be packaged in a pack case to form a battery pack.

The battery module described above and the battery pack including the same may be applied to various devices. These devices may be transportation means such as electric bicycles, electric vehicles, hybrid electric vehicles, and the like, but the present disclosure is not limited thereto, and the present disclosure may be applied various devices that can use a battery module and a battery pack including the same, which is also within the scope of the right of the present disclosure.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery cell, comprising:
a battery case having an accommodation portion with an electrode assembly disposed therein,
a sealing portion formed by sealing an outer periphery of the battery case; and
a gas discharge portion disposed in the sealing portion,
wherein the gas discharge portion extends from an inside of the battery case toward an outside of the battery case across the sealing portion,
the gas discharge portion includes a non-adhesive layer and an adhesive layer located on the non-adhesive layer, the non-adhesive layer and the adhesive layer being bent such that a gas inlet of the gas discharge portion opens toward the inside of the battery case,
wherein the non-adhesive layer includes a first non-adhesive layer and a second non-adhesive layer spaced apart from the first non-adhesive layer, and an end of the first non-adhesive layer and an end of the second non-adhesive layer adjacent to an outer side of the sealing portion being connected with each other,
wherein the gas inlet is located between the first non-adhesive layer and the second non-adhesive layer.

2. The battery cell according to claim 1, wherein the adhesive layer includes a first adhesive layer located on an upper surface of the first non-adhesive layer and a second adhesive layer located on a lower surface of the second non-adhesive layer, and
an end of the first adhesive layer and an end of the second adhesive layer adjacent to the outer side of the sealing portion being connected with each other.

3. The battery cell according to claim 2, wherein the first adhesive layer extends along a side surface of the first non-adhesive layer along the gas discharge portion, and the second adhesive layer extends along a side surface of the second non-adhesive layer along the gas discharge portion.

4. The battery cell according to claim 3, wherein the first adhesive layer and the second adhesive layer extend between the first non-adhesive layer and the second non-adhesive layer along the gas discharge portion, respectively.

5. The battery cell according to claim 4, wherein a pair of first adhesive layers and a pair of second adhesive layers are located at both sides of the gas inlet, respectively.

6. The battery cell according to claim 1, wherein the adhesive layer surrounds a lower surface and both side surfaces of the non-adhesive layer and surrounds both ends of an upper surface of the non-adhesive layer, the adhesive layer and the non-adhesive layer being folded about a boundary line.

7. The battery cell according to claim 1, wherein the non-adhesive layer is a film made of a non-adhesive material.

8. The battery cell according to claim 7, wherein the non-adhesive material is made of a fluorine-based polymer material.

9. The battery cell according to claim 8, wherein the fluorine-based polymer material is at least one of polytetrafluoroethylene (PTFE), polyvinylidene fluoride (PVDF), polymethylpentene (TPX), fluorinated ethylene propylene (FEP), and perfluoroalkoxyalkane (PFA).

10. The battery cell according to claim 1, wherein the adhesive layer is made of an adhesive composition consisting of at least one of polyolefin-based material, epoxy, and polyvinyl chloride (PVC).

11. The battery cell according to claim 10, wherein the adhesive layer is a film made of the adhesive composition.

12. The battery cell according to claim 10, wherein the adhesive layer is formed by applying the adhesive composition on the non-adhesive layer.

13. The battery cell according to claim 1, wherein the adhesive layer has a thickness equal to or smaller than a thickness of the non-adhesive layer.

14. The battery cell according to claim 1, wherein the adhesive layer has gas permeability of 20 Barrer to 60 Barrer at 60° C.

15. The battery cell according to claim 1, wherein the non-adhesive layer has gas permeability of 40 Barrer or more at 60° C.

16. The battery cell according to claim 1, wherein the adhesive layer has a moisture penetration amount of 0.02 g to 0.2 g for 10 years at 25° C., 50% RH.

17. A battery module, comprising the battery cell according to claim 1.

* * * * *